United States Patent [19]

Axelrod et al.

[11] Patent Number: 4,562,120
[45] Date of Patent: Dec. 31, 1985

[54] HEAT-RESISTANT, OPTICALLY-BLACK COATING

[75] Inventors: Randolph H. Axelrod, Warwick Township, Lancaster County; Joseph J. Piascinski, Upper Leacock Township, Lancaster County, both of Pa.

[73] Assignee: RCA Corporation, Princeton, N.J.

[21] Appl. No.: 640,409

[22] Filed: Aug. 10, 1984

[51] Int. Cl.⁴ .............................................. B32B 9/00
[52] U.S. Cl. .................................... 428/469; 427/163; 428/450; 428/454; 428/689; 428/699; 430/528; 354/1
[58] Field of Search ............... 428/450, 454, 446, 448, 428/469, 913, 333, 689, 688, 699; 427/162, 160, 163; 354/1; 430/528, 23, 139

[56] References Cited

U.S. PATENT DOCUMENTS

| 2,076,183 | 4/1937 | Michaud | 428/450 |
| 2,942,099 | 6/1960 | Goldstein | 240/1 |
| 3,970,456 | 7/1976 | Branton | 96/36.1 |
| 4,041,000 | 8/1977 | Farcnik | 524/443 |
| 4,150,191 | 4/1979 | Karki | 428/454 |
| 4,277,537 | 7/1981 | Woodman | 428/409 |

Primary Examiner—Edith Buffalow
Attorney, Agent, or Firm—Eugene M. Whitacre; Dennis H. Irlbeck; LeRoy Greenspan

[57] ABSTRACT

An optically-black coating that is adherent to metal surfaces, has a low reflectance of light in the range of about 2000 to 7500 Angstroms, and is chemically stable up to at least 750° C., consists essentially of a minor proportion of an inorganic silicate binder and a major proportion of a particulate mixture of cobaltic oxide and zinc oxide in the weight ratio range of 4/1 to 1/1.

4 Claims, 1 Drawing Figure

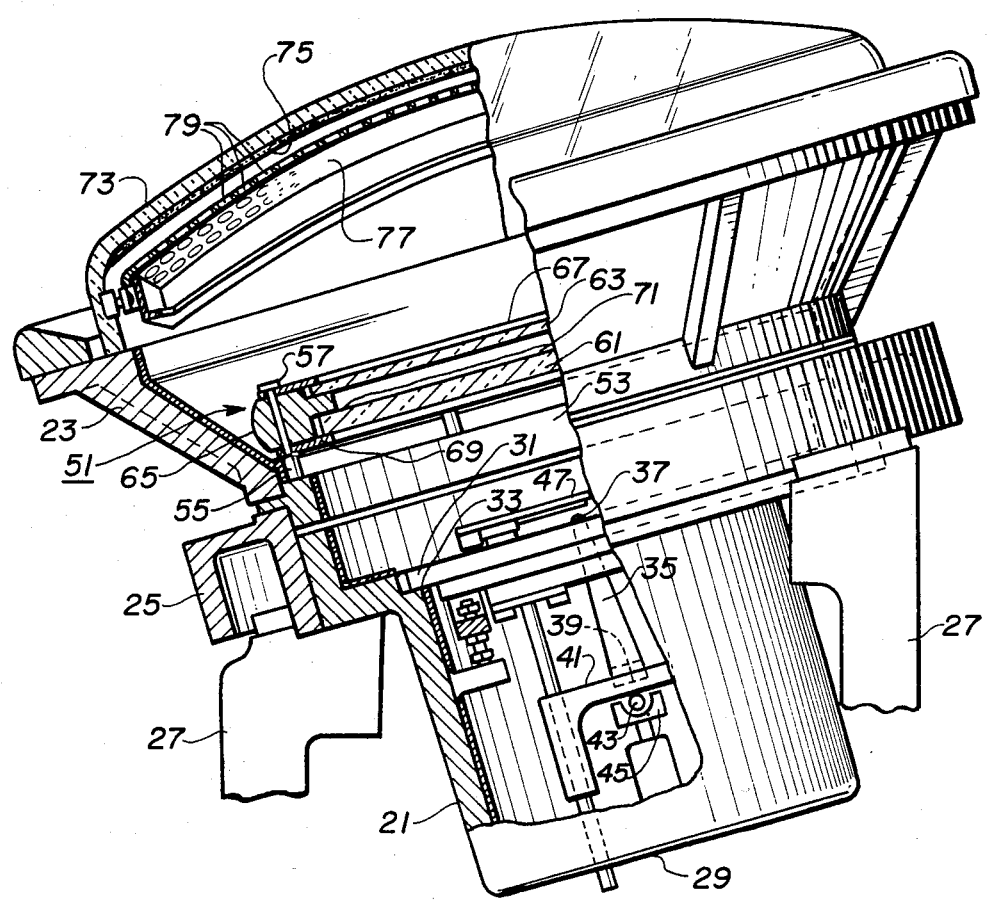

HEAT-RESISTANT, OPTICALLY-BLACK COATING

BACKGROUND OF THE INVENTION

This invention relates to a heat-resistant, optically-black coating that is adherent to metal surfaces. The coating is particularly useful for reducing the reflection of visible and ultraviolet light from the inner surfaces of an exposure lighthouse that is used for producing mosaic-type viewing screens for cathode-ray tubes.

Exposure lighthouses that are used for producing mosaic-type viewing screens for cathode-ray tubes are described in the prior art; for example, in U.S. Pat. Nos. 2,942,099 to N. R. Goldstein, 3,592,112 to H. R. Frey and 3,970,456 to T. W. Branton. Such lighthouses generally include a metal light box, a cooled, small-area lamp which emits both visible and ultraviolet light and optical components for reflecting and refracting light from the lamp to a photosensitive layer on a support for the viewing screen. Except for the optical components, it is desirable that inner surfaces of the lighthouse carry a light-absorbent coating that reflects a minimum of light that is incident thereon in order to minimize light scattering. In this application, the coated inner surfaces must absorb both visible and ultraviolet light, preferably in the range of 2000 to 7500 Å. Because some lighthouse parts reach temperatures above 700° C., the lighthouse parts are made of refractory metal, usually steel. This requires that the light-absorbent coating be chemically stable up to at least 750° C. and adherent to metal. Coatings with organic binders are unsatisfactory because they are degraded by temperatures above about 400° C. Because the inner surfaces involve a plurality of parts, it is desirable that the coating can be applied either before or after the parts are assembled.

With the evolution of high-resolution display cathode-ray tubes, it has become more important to minimize light scattering in the lighthouses. Light scattering is a cause of poor uniformity and cross contamination in the viewing screens produced on the lighthouse. Previous black coatings on steel or other metal surfaces are unsatisfactory because they lack at least one of the above-described characteristics.

SUMMARY OF THE INVENTION

The novel optically-black coating is adherent to metal surfaces, has a low reflectance of light in the range of about 2000 to 7500 Å, and is chemically stable up to at least 750° C. Also, the novel coating may be applied to metal parts before or after they have been assembled into an operable apparatus.

The novel coating consists essentially of a minor proportion of an inorganic silicate binder and a major proportion of a particulate mixture of cobaltic oxide and zinc oxide in the weight ratio of 4/1 to 1/1. The silicate binder imparts the good adherence to metal surfaces. The cobaltic oxide imparts the good absorbency of visible light. The zinc oxide, which is visually white, imparts the good absorbency of ultraviolet light. All of the components are chemically stable both at elevated temperatures up to 750° C. and at room temperature in mixtures with water, which is the preferred vehicle for use in applying the coating.

BRIEF DESCRIPTION OF THE DRAWING

The sole FIGURE is a partially broken-away elevational view of a lighthouse showing the novel coating on some of the internal surfaces thereof.

DESCRIPTION OF THE PREFERRED EMBODIMENT

The novel coating may be used on any surface that is desired to be particularly absorbent of light in the range of 200 to 750 nanometers. One such use is on internal surfaces of an exposure lighthouse, shown in the sole FIGURE, that is adapted for preparing viewing screens for use in cathode-ray tubes. The lighthouse comprises a light box 21 and a panel support 23 held in position with respect to one another on a base 25 and supported on legs 27 at a desired angle.

The light box 21 is a cylindrical cup-shaped casting that is closed at one end by an integral end wall 29. The other end of the light box 21 is closed by a plate 31, which fits in a circular recess 33 in the box 21. The plate 31 has a central hole therein through which a light pipe or collimator 35 extends. The narrow end 37 of the light pipe 35 extends slightly beyond the plate 31 and constitutes a point source of light for the lighthouse. The wider end 39 is held in position by a bracket 41 opposite a high-pressure mercury vapor lamp 43. A reflector 45 is held in position behind the lamp 43. An eclipser 47 blocks the upward path of light emitted from the narrow end 37 between exposures, but can be swung out of the light path for an exposure.

A lens assembly 51 is mounted on a support ring 53 and standoff spacers 55 with bolts 57. The support ring 53 is clamped between the panel support 23 and the base 25. The lens assembly 51 includes a correction lens 61, a wedge lens 63, a separator ring 65, an upper clamp 67 and a lower clamp 69. The upper surface of the correction lens 61 carries an optical filter 71.

In one mode for operating the lighthouse, a faceplate panel 73 is placed in position on the panel support 23 as shown in the sole FIGURE. The panel 73 has a layer 75 of light-hardenable binder and phosphor particles on its inner surface, and an apertured mask 77 mounted therein and spaced from the layer 75. To make an exposure, the eclipser 47 is swung out of the light path, permitting the combination of visible and ultraviolet light from the operating lamp 43 and emitted from the narrow end 37 of the light pipe to pass upward through the apertures 79 in the mask 77 incident upon the layer 75. When the desired exposure time for the layer 75 has elapsed, the eclipser 47 is swung back into its normal position, eclipsing the light emitted from the narrow end 37. The cycle is then repeated for a succession of panels.

The visible and ultraviolet light from the lamp 43 and emitted from the narrow end 37 is intense, and there would be enough scattered visible and ultraviolet light to cause fogging and/or irregular exposure of the layer 75 if no special precautions are made. To absorb substantially all of the scattered light, most of the internal metal surfaces are covered with a novel coating 81. The coating 81 is shown for simplicity only on the exposed inner surfaces of the box 21, the panel support 23 and the support ring 53. However, the novel coating is present on substantially all of the other exposed inner surfaces.

The considerable power dissipated by the lamp may require that the lamp 43 be cooled with water or compressed air. Even with cooling, the heat and radiation from the lamp 43 cause the temperatures of all of the metal parts to rise to above 300° C. and, in some areas, as high as 700° C. Thus, the novel coating 81, to be practical in this application, should be chemically stable up to at least 750° C., be adherent to metal surfaces over that temperature range, and be a good absorber of both visible and ultraviolet light in the range of about 200 to 750 nanometers over that temperature range. Also, because only inner surfaces of the assembled parts are coated, the novel coating is desirably prepared from a formulation that can be applied either before or after the parts are assembled.

EXAMPLE

A preferred water-based formulation for producing the novel coating 81, in weight parts, is as follows:

604 cobaltic oxide $Co_2O_3$ 70–75% pure, Hall Chemical Co., Wicliff, Ohio 302 zinc oxide ZnO 99% pure, Fisher Scientific Co., Fair Lawn, N.J.

533 sodium silicate, C-Brand 54% solids, PQ Corp., Valley Forge, PA

6 Marasperse C-21, Reed Lignin Co., Rothchild, WI 1500 water—deionized

The foregoing formulation is ball milled for 6 hours to form a water-based paint having solid particles with average particle size of about 3.5 microns. Then, 27 weight parts Brij 35 marketed by ICI Americas, Inc., Wilmington, Del. is mixed into the paint. The paint is applied as a thin layer to the desired surfaces by brushing, air spray or airless spray and permitted to dry in air at room temperature to a dry film thickness of about 0.025 mm (1.0 mil). Upon operation of the lighthouse, the normal heating of the metal parts as described above is sufficient to cure the coating to its stable properties of light absorption and hardness. If a separate curing is desired, then the coating parts may be baked in air for about 30 minutes at about 100° C. After baking in air above 300° C., all of the moisture and organic material is driven out and only the inorganic material remains.

SOME GENERAL CONSIDERATIONS

While other black oxides such as nickel oxide and manganese sesquioxide may be substituted for cobaltic oxide, and other white oxides such as magnesium oxide and lead oxide may be substituted for zinc oxide, only the combination of cobaltic oxide and zinc oxide produces in the novel coating such low reflectance of 3650 Å radiation and high resistance to turning gray when exposed to temperatures above 500° C. in air. The Table below provides some comparative reflectance data with 3650 Å radiation to evidence this point.

The range of particle sizes is the range for smooth paint coatings. While an aqueous sodium silicate solution is preferred, one or more of lithium-stabilized silica sol, lithium silicate, sodium silicate, potassium silicate, tetraethyl orthosilicate, and colloidal silica in water as the vehicle may be used. The dry silicate solids should constitute 15 to 25 weight percent of the total dry solids (silicate plus oxides). The weight ratio of black oxide to white oxide should be in the range of 4/1 to 1/1. It is preferred that the formulation be free from copper in any form.

The ingredients of the paint are mixed and blended with a dispersant, as for other paints. Then, the paint is applied by any coating technique to produce a dry coating about 0.013 to 0.063 mm (0.5 to 2.5 mils) thick. This requires a wet coating that is about four times thicker than the dry coating. Dry coatings thinner than 0.013 mm do not exhibit sufficient ultraviolet light absorption. Dry coatings thicker than 0.063 mm are prone to blister and/or crack. The wet coating is dried in air and then cured for 15 to 60 minutes at temperatures in the range of 100° to 300° C. Coatings with colloidal silica binders are generally at or near the lower ends of the ranges, while coatings with alkali silicate binders are generally at or near the upper ends of the ranges.

The novel coating may be coated on the surface of any common metal, such as, for example, iron, steel, aluminum alloy and brass. The novel coating may be applied as a paint with water as a vehicle by any known coating technique such as spraying, brushing, dipping and doctor blading. For use in equipments for making luminescent viewing screens for cathode-ray tubes, the paint and the resultant coating should be free from copper. The paint is easily applied to a surface of a metal part either before or after the part is assembled with other parts.

The novel coating was compared for reflectance of light in a narrow band around 3650 Å with coatings produced with commercially-available coatings. The incident light was produced by filtering the emission from a Westinghouse H44GS-100 lamp to remove substantially all of the spectral radiation except the narrow band around 3650 Å. The tests used a standard of Vitrolite with total reflectance assigned the value of 100 and total nonreflectance assigned a value of zero. The results, shown in the following Table, show the surprisingly-low reflectance of 3650 Å radiation of the preferred coating described above, especially considering that both a black oxide and a white oxide are present.

TABLE

| Coating | Reflectance of 3650 Å | Comments |
|---|---|---|
| Black Solar Chem[1] | 11.00 | Did not survive 750° C. |
| Sicon Black[2] | 6.00 | Reflectivity too high |
| Bright Beauty[3] | 5.20 | Reflectivity too high |
| Nextel[4] | 3.30 | Did not survive 200° C. |
| Example Above | 3.75 | After baking at 350° C. |
| Example Above | 2.50 | After baking at 725° C. |

[1] Marketed by Eastern Chem. Lac Corp., Malden, Mass.
[2] Marketed by Dexter Corp., Waukegan, IL
[3] Marketed by Duplicolor Products Co., Elk Grove Village, IL
[4] Marketed by 3M, St. Paul, Minn.

What is claimed is:

1. A metal substrate having adhered thereto an optically black coating, having a low reflectance of light in the range of about 2000 to 7500 Å, chemically stable up to at least 750° C., and consisting essentially of a minor proportion of an inorganic silicate binder and a major proportion of a particulate mixture of cobaltic oxide and zinc oxide in the weight ratio range of 4/1 to 1/1.

2. The coating defined in claim 1 wherein the ratio of cobaltic oxide to zinc oxide is about 1.5/1.0.

3. The coating defined in claim 1 wherein said silicate binder constitutes about 15 to 25 weight percent of said coating.

4. The coating defined in claim 1 wherein said substrate is steel.

* * * * *